(12) United States Patent
Kim et al.

(10) Patent No.: US 8,430,551 B2
(45) Date of Patent: Apr. 30, 2013

(54) DISPLAY APPARATUS AND METHOD OF ASSEMBLING THE SAME

(75) Inventors: Hyoung-Joo Kim, Anyang-si (KR); Joo Young Kim, Cheonan-si (KR); Young-Min Park, Seoul (KR); So-Yeon Lee, Hwaseong-si (KR); Gicherl Kim, Asan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 98 days.

(21) Appl. No.: 13/193,273

(22) Filed: Jul. 28, 2011

(65) Prior Publication Data

US 2012/0170309 A1    Jul. 5, 2012

(30) Foreign Application Priority Data

Jan. 3, 2011    (KR) .................. 10-2011-0000280

(51) Int. Cl.
*F21V 7/04* (2006.01)
(52) U.S. Cl.
USPC ............ 362/621; 362/532; 362/558; 362/615
(58) Field of Classification Search .................. 362/621, 362/558, 532, 97.1, 622, 615
See application file for complete search history.

(56) References Cited

U.S. PATENT DOCUMENTS

| 7,163,330 | B2 | | 1/2007 | Matsui et al. | |
|---|---|---|---|---|---|
| 7,507,011 | B2 | * | 3/2009 | Ueno et al. | 362/625 |
| 7,565,949 | B2 | * | 7/2009 | Tojo | 181/199 |
| 7,815,338 | B2 | * | 10/2010 | Siemiet et al. | 362/218 |
| 7,824,094 | B2 | * | 11/2010 | Hsieh | 362/626 |
| 2009/0195726 | A1 | * | 8/2009 | Na et al. | 349/58 |
| 2010/0149836 | A1 | * | 6/2010 | Hung et al. | 362/634 |

* cited by examiner

*Primary Examiner* — Ali Alavi
(74) *Attorney, Agent, or Firm* — F. Chau & Associates, LLC

(57) ABSTRACT

In a display apparatus, a light guide plate includes a chamfered corner portion that defines a light incident surface. A light source unit is arranged adjacent to the light incident surface to provide the light to the light guide plate through the light incident surface. A display panel receives light from the light guide plate to display an image. A receiving container includes sidewalls and a bottom portion to accommodate the light guide plate and the light source unit. At least one sidewall adjacent to the corner portion is divided into a first part and a second part that may be coupled to or separated from each other. Thus, the light guide plate and the light source unit may be easily accommodated in the receiving container, thereby improving an assembling efficiency.

20 Claims, 15 Drawing Sheets

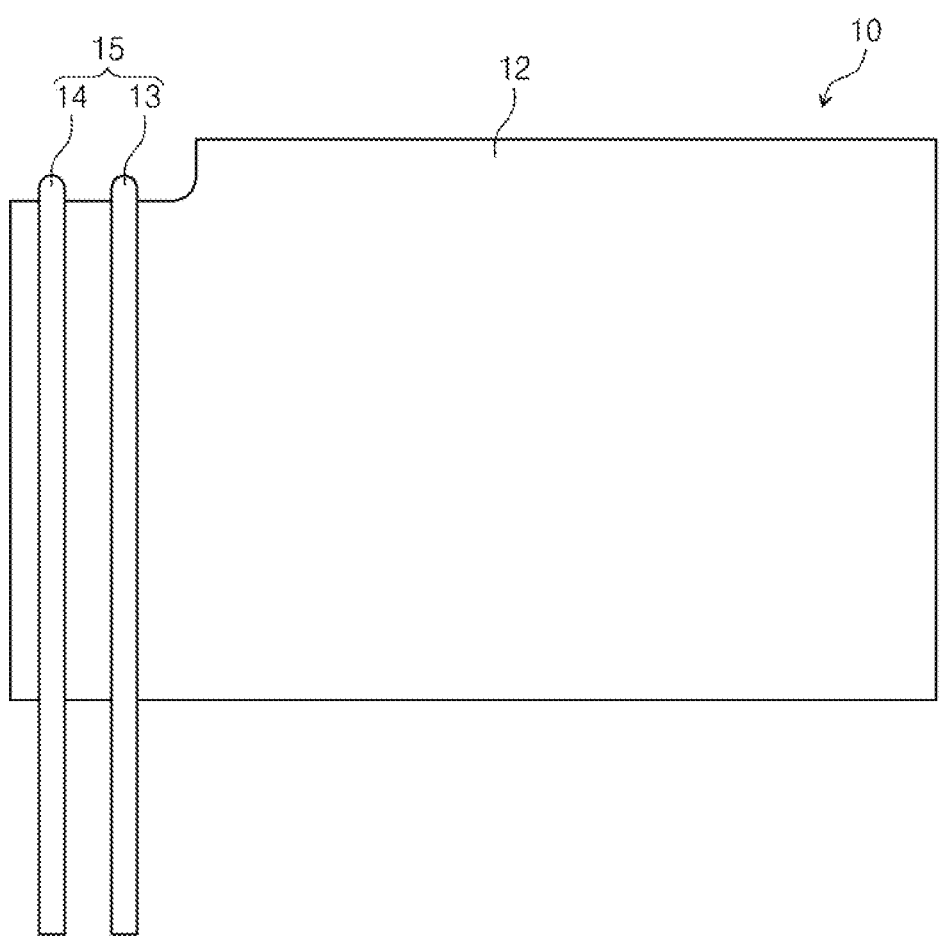

DISPLAY APPARATUS AND METHOD OF ASSEMBLING THE SAME

CROSS-REFERENCE TO RELATED APPLICATION

This application claims priority from Korean Patent Application No. 10-2011-0000280 filed on Jan. 3, 2011 in the Korean Intellectual Property Office, the contents of which are herein incorporated by reference in their entirety.

BACKGROUND

1. Technical Field

The present disclosure is directed to a display apparatus and a method of assembling the same. In particular, the present disclosure is directed to a backlight unit of a display apparatus capable of improving display quality and reducing a number of parts and a method of assembling the backlight unit.

2. Description of the Related Art

In recent years, a backlight assembly having a light emitting diode as its light source and a display apparatus having the backlight assembly has been developed. Backlight assemblies having a light emitting diode have lower power consumption, higher brightness, and are slimmer, when compared to backlight assemblies having a cold cathode fluorescent lamp as its light source. However, the manufacturing cost of a backlight assembly increases for backlight assemblies using light emitting diodes as light sources instead of cold cathode fluorescent lamps.

SUMMARY

Exemplary embodiments of the present disclosure provide a display apparatus capable of reducing a number of parts.

Exemplary embodiments of the present disclosure also provide a method of assembling the display apparatus.

According to exemplary embodiments of the present disclosure, a backlight assembly of a display apparatus includes a light guide plate, a light source unit, and a receiving container.

The light guide plate includes a chamfered corner portion that defines a light incident surface defined at the corner portion. The light source unit is disposed adjacent to the light incident surface to provide light to the light guide plate through the light incident surface.

The receiving container includes sidewalls and a bottom portion extended from at least one of the sidewalls to accommodate the light guide plate and the light source unit.

At least one of the sidewalls of the receiving container is divided into a first part and a second part at a position adjacent to the corner portion, and the first and second parts may be coupled to or separated from each other.

According to exemplary embodiments of the present disclosure, a method of assembling the display apparatus is provided as follows. A light guide plate is prepared to have a chamfered corner portion to form a light incident surface positioned at the corner portion. Then, a light source unit is disposed adjacent to the light incident surface to provide light to the light guide plate through the light incident surface. A receiving container including sidewalls and a bottom portion extending from at least one of the side walls is prepared. A sidewall disposed adjacent to the corner portion is divided into a first part and a second part. The second part may be separated from the first part to accommodate the light guide plate and the light source in the receiving container. The first and second parts may be coupled to each other after accommodating the light guide plate and the light source in the receiving container. A cover member is coupled to the receiving container to partially cover the display panel while exposing an area in which an image may be displayed.

According to exemplary embodiments of the present disclosure, a backlight assembly includes a light guide plate, a light source unit, and a receiving container.

The light guide plate includes a chamfered corner portion that forms a light incident surface at the corner portion. The light source unit is disposed adjacent to the light incident surface to provide light to the light guide plate through the light incident surface.

The receiving container is configured to accommodate the light guide plate and the light source unit. A sidewall of the receiving container adjacent to the corner portion is divided into a first part and a second part configured to separate from each other to receive the light guide plate and light source unit.

The light guide plate further includes an extended portion that extends from one side surface adjacent to the light incident surface, and lengthens the light incident surface.

According to the above, the sidewall adjacent to the light source unit is divided into the first part and the second part, and the first part may be coupled to the second part after accommodating the light guide plate and the light source unit in the receiving container. Thus, the light guide plate and the light source unit may be easily accommodated in the receiving container, improving assembling efficiency.

BRIEF DESCRIPTION OF THE DRAWINGS

FIGS. 14A to 14C are views showing a light source unit of FIG. 12 in detail.

DETAILED DESCRIPTION OF EXEMPLARY EMBODIMENTS

It will be understood that when an element or layer is referred to as being "on", "connected to" or "coupled to" another element or layer, it can be directly on, connected or coupled to the other element or layer or intervening elements or layers may be present. Like numbers may refer to like elements throughout.

Hereinafter, exemplary embodiments will be explained in detail with reference to the accompanying drawings.

Figure 1:
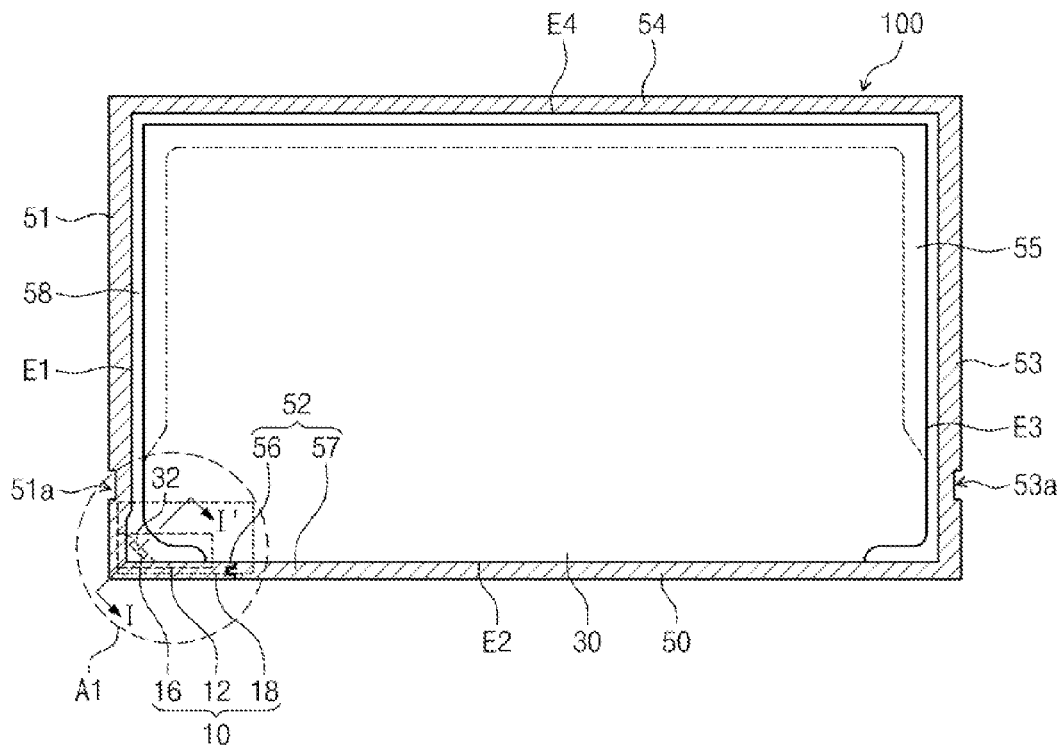
FIG. 1 is a plan view showing a backlight assembly according to an exemplary embodiment of the present disclosure.
Figure 2:
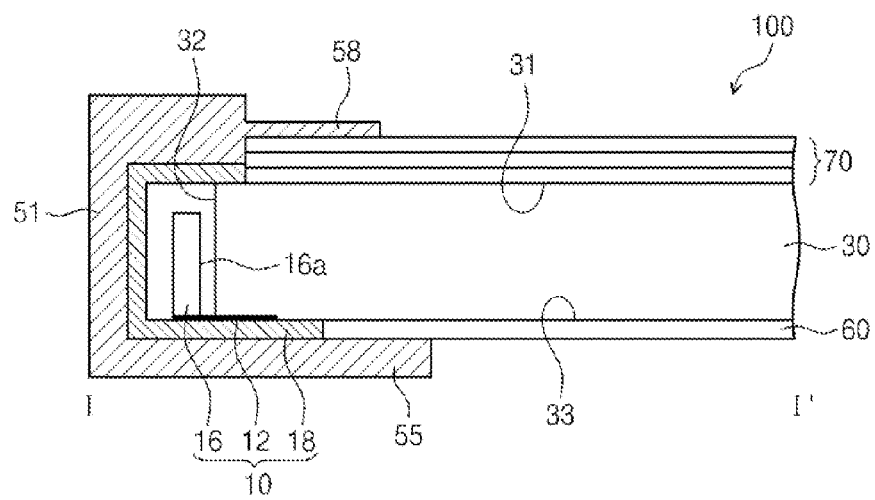
FIG. 2 is a cross-sectional view taken along a line I-I' of FIG. 1.

FIG. 1 is a plan view showing a backlight assembly according to an exemplary embodiment of the present disclosure, and FIG. 2 is a cross-sectional view taken along a line I-I' of FIG. 1.

Referring to FIGS. 1 and 2, a backlight assembly 100 includes a light guide plate 30, a light source unit 10, a receiving container 50, a reflection plate 60, and optical sheets 70.

The light guide plate 30 has a rectangular plate shape and receives light from the light source unit 10 to guide the light in a certain direction. For example, when the backlight assembly 100 is used as a light source of a liquid crystal display having a liquid crystal display panel, the light guide plate 30 may guide the light received from the light source unit 10 to the liquid crystal display panel.

According to a present exemplary embodiment, the light guide plate 30 includes a chamfered corner portion that is provided with a light incident surface 32 defined by the chamfered corner portion. In particular, the light guide plate 30 includes a first side E1, a second side E2 arranged adjacent to the first side E1, a third side E3 facing the first side E1, and a fourth side E4 facing the second side E2. The light incident surface 32 may be formed by chamfering the corner portion where the first side E1 connects to the second side E2.

The light guide plate 30 further includes an upper surface 31 connected to the first to fourth sides E1 to E4 that outputs the light and a lower surface 33 connected to the first to fourth sides E1 to E4 that is substantially parallel to the upper surface 31.

The light source unit 10 includes a light source 16 generating light, a back cover 18 covering the light source 16, and a circuit board 12 on which the light source 16 is mounted to provide a driving power to the light source 16.

The light source 16 includes a light emitting surface 16a facing and substantially parallel to the light incident surface 32. In a present exemplary embodiment, the light source 16 may be a light emitting diode (LED), and the light source unit 10 may include a plurality of light emitting diodes.

The back cover 18 is bent to surround the light source 16 and a portion of the back cover 18 is opened to expose the light emitting surface 16a of the light source 16. The back cover 18 may include a material, e.g., aluminum (Al), to reflect light exiting from the light source 16 to the light guide plate 30, thereby increasing the light intensity provided to the light guide plate 30.

The circuit board 12 is electrically connected to the light source 16 and a power supply (not shown) and applies the driving power received from the power supply to the light source 16. The circuit board 12 may be one of a flexible printed circuit (FPC) film, a double-sided flexible printed circuit film, or a metal printed circuit board (MPCB). In addition, the circuit board 12 may be disposed between the light source 16 and the back cover 18.

The receiving container 50 includes sidewalls 51, 52, 53, and 54 connected to have a frame shape and a bottom portion 55 extended from at least one of the sidewalls 51, 52, 53, and 54 to accommodate the light source unit 10 and the light guide plate 30.

In a present exemplary embodiment, the receiving container 50 may include a first sidewall 51, a second sidewall 52, a third sidewall 53, and a fourth sidewall 54. The first sidewall 51 is arranged parallel to the first side E1 of the light guide plate 30 to face the first side E1. The second sidewall 52 is arranged parallel to the second side E2 of the light guide plate 30 to face the second side E2. The third sidewall 53 is arranged parallel to the third side E3 of the light guide plate 30 to face the third side E3. The fourth 54 is arranged parallel to the fourth side E4 of the light guide plate 30 to face the fourth side E4.

The first to fourth sidewalls 51, 51, 53, and 54 may form a rectangular frame shape. At least one of the first and second sidewalls 51 and 52 adjacent to the light incident surface 32 may be divided into two parts. In a present exemplary embodiment, the second sidewall 52 between the first and third sidewalls 51 and 53 is divided into a first part 56 and a second part 57 as shown in FIG. 1. The second sidewall 52 may be divided into the first and second parts 56 and 57 in an area adjacent to the light incident surface 32.

The first and second parts 56 and 57 may have a structure in which end portions of the first and second parts 56 and 57, which face each other, may couple to each other. More detailed descriptions of the structure of the first and second parts 56 and 57 will be described with reference to FIGS. 4 to 8.

The receiving container 50 may further include a cover part 58 that extends from the first, second, third, and fourth sidewalls 51, 52, 53, and 54 to cover an edge portion of the upper surface 31 of the light guide plate 30.

The optical sheets 70 are mounted on the upper surface 31 of the light guide plate 30. The optical sheets 70 may include at least one prism sheet condensing the light exiting from the light guide plate 30 to improve a front brightness and at least one diffusion sheet diffusing the light.

End portions of the optical sheets 70 may be disposed between the cover part 58 and the light guide plate 30. Thus, the cover part 58 may prevent the optical sheets 70 from separating from the light guide plate 30.

The backlight assembly 100 may further include the reflection plate 60. The reflection plate 60 includes a material to reflect light, such as polyethylene terephthalate (PET) or aluminum, and is disposed between the bottom portion 55 of the receiving container 50 and the light guide plate 30. Thus, light propagating from the light source 16 to the bottom portion 55 may be reflected by the reflection plate 60 to be provided to the light guide plate 30, thereby increasing the intensity of the light provided to the light guide plate 30.

In addition, the receiving container 50 is provided with a first user hole 51a formed by removing a portion from the first sidewall 51 parallel to the first side E1 and a second user hole 53a formed by removing a portion from the third sidewall 53 parallel to the third side E3. More detailed description of the first and second user holes 51a and 53a will be described with reference to FIG. 11.

Figure 3:
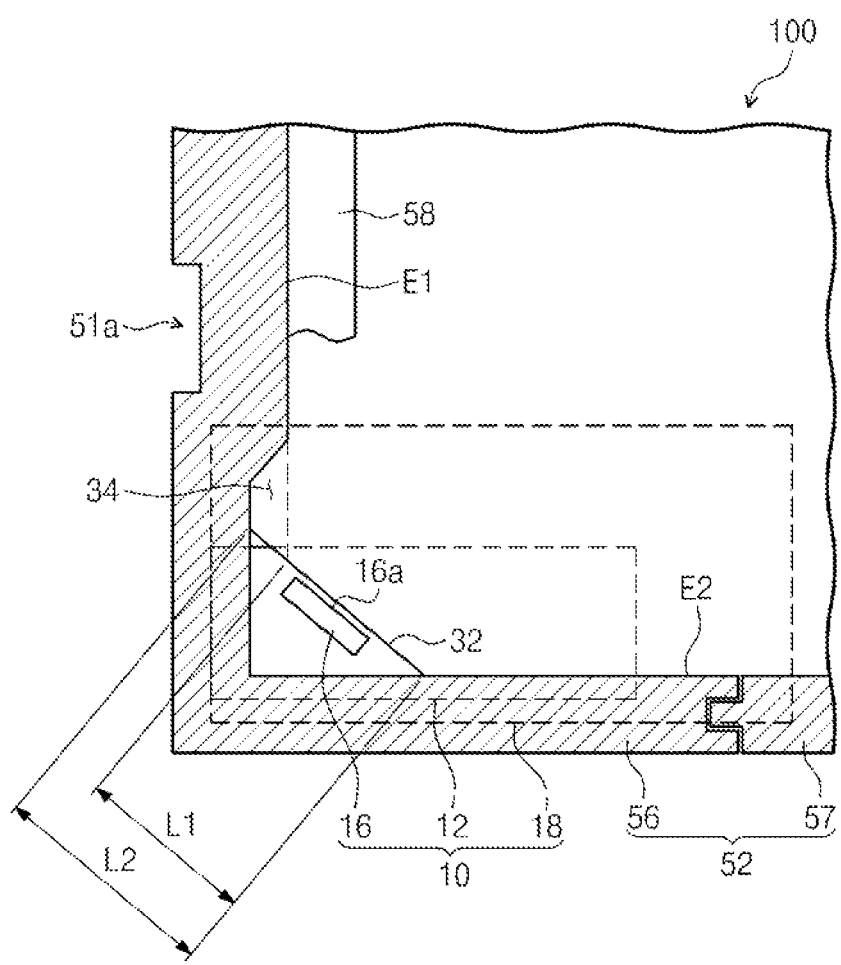
FIG. 3 is a partially enlarged view showing a portion A1 of FIG. 1.

FIG. 3 is a partially enlarged view showing a portion A1 of FIG. 1. For convenience of explanation, FIG. 3 shows a structure in which the cover part 58 of the receiving container 50 is partially removed to expose the light guide plate 30 and the light source 16.

Referring to FIG. 3, the light emitting surface 16a of the light source 16 is arranged to face the light incident surface 32 of the light guide plate 30. The light guide plate 30 further includes an extended portion 34 adjacent to the light incident surface 32 that extends from the first side E1 to the first sidewall 51 of the receiving container 50. The extended portion 34 may connect to the light incident surface 32. A first length L1 of the light incident surface 32 may be increased by the extended portion 34 to a second length L2 greater than the first length L1.

Also, if the first user hole 51a is formed in an area of the first sidewall 51 corresponding to the extended portion 34, the first sidewall 51 may lack a sufficient thickness in the area where the first user hole 51a is formed. As a result, the light guide plate 30 may contact and be damaged by a screw (not shown) contained in the first user hole 51a. However, if the first user hole 51a is formed outside the area corresponding to the extended portion 34, the first sidewall 51 may retain a sufficient thickness in the area in which the first user hole 51a is formed, thereby preventing screw damage to the light guide plate 30.

Figure 4:
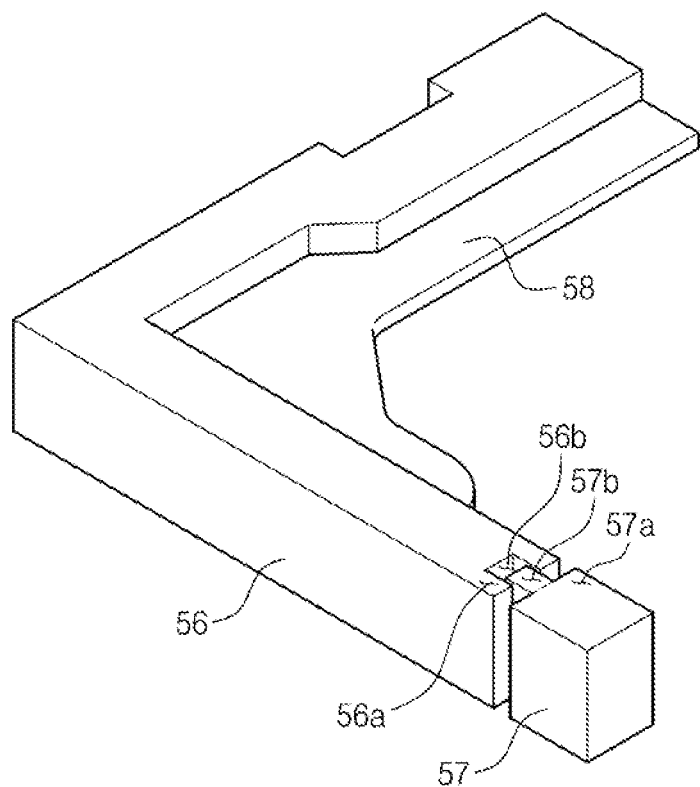
FIG. 4 is a perspective view partially showing a receiving container of FIG. 3.
Figure 5:
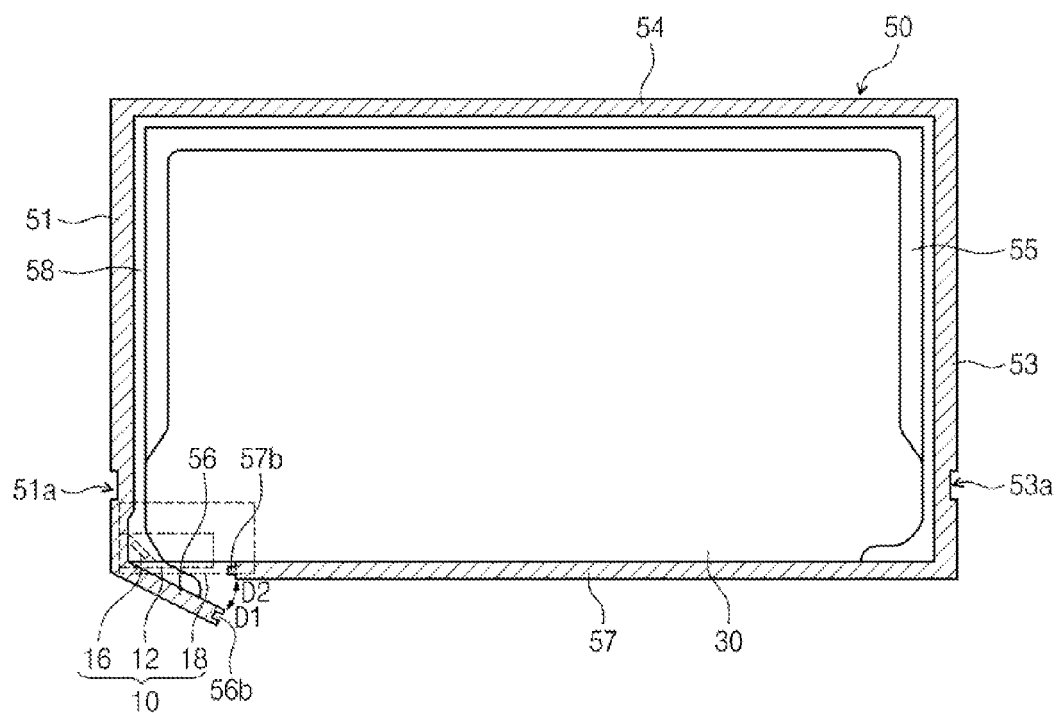
FIG. 5 is a plan view showing first and second parts of the second sidewall, which are separated from each other.

FIG. 4 is a perspective view partially showing the receiving container of FIG. 3, and FIG. 5 is a plan view showing the first and second parts of the second sidewall, which are separated from each other.

Referring to FIG. 4, the second sidewall 52 of the receiving container 50 is divided into the first part 56 and the second part 57. However, according to other embodiments, the first sidewall 51 adjacent to the light incident surface 32 may be divided into the first and second parts 56 and 57.

A first end 56a of the first part 56 is arranged to face a second end 57a of the second part 57. The second part 57 includes a first protrusion 57b protruding outward from the second end 57a toward the first end 56a. The first part 56 is provided with a first coupling recess 56b recessed in from the first end 56a to accommodate the first protrusion 57b. Thus, the first protrusion 57b may be accommodated in the first coupling recess 56b, so that the first and second parts 56 and 57 may be coupled to each other.

As shown in FIG. 5, the second part 57 is longer than the first part 56. The first part 56 may bend in a first direction D1 and a second direction D2 opposite to the first direction D1 about the corner with the first sidewall.

The light guide plate 30 and the light source unit 10 are accommodated in the receiving container 50 after the first part 56 bends in the first direction D1 to separate from the second part 57. Then, when the light guide plate 30 and the light source unit 10 are completely accommodated in the receiving container 50, the first part 56 bends back to its original position in the second direction D2 to couple to the second part 57.

When the first protrusion 57b is accommodated in the first coupling recess 56b to couple the first and second parts 56 and 57 together, the first part 56 may be prevented from bending in the first direction D1.

Figure 6:
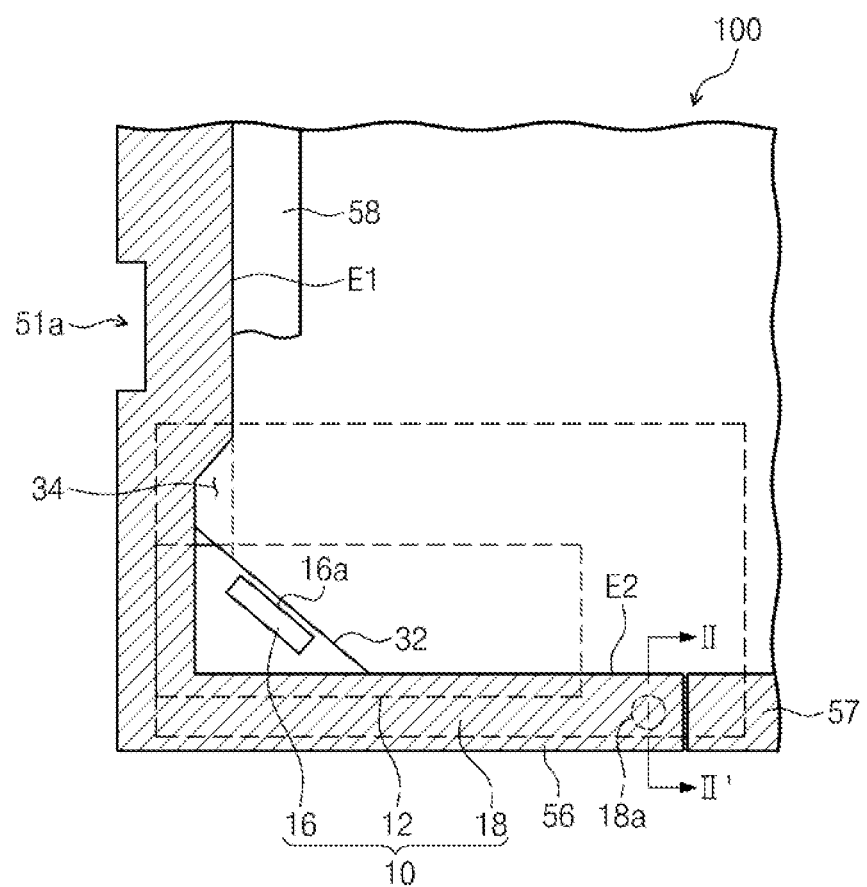
FIG. 6 is a plan view partially showing a backlight assembly according to another exemplary embodiment of the present disclosure.
Figure 7:
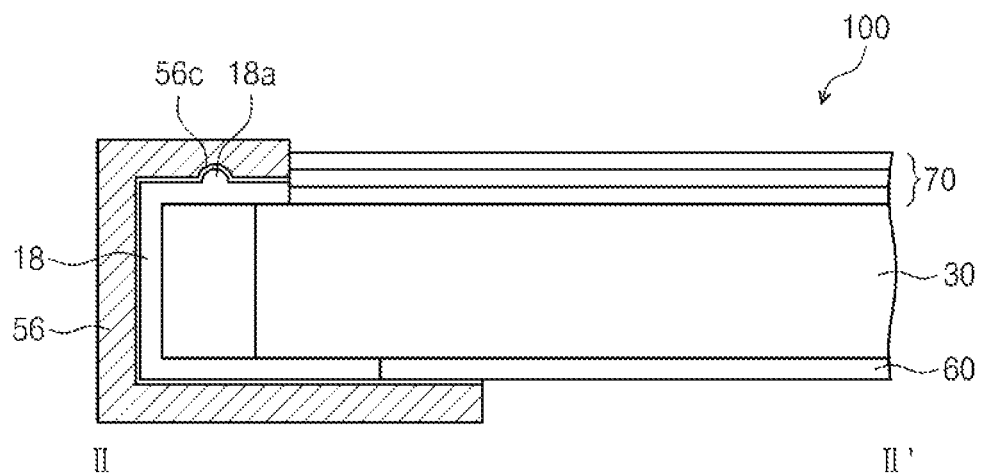
FIG. 7 is a cross-sectional view taken along a line II-II' of FIG. 6.

FIG. 6 is a plan view partially showing a backlight assembly according to another exemplary embodiment of the present disclosure, and FIG. 7 is a cross-sectional view taken along a line II-II' of FIG. 6.

Referring to FIGS. 6 and 7, the first end 56a and the second end 57a of the first and second parts 56 and 57 of the receiving container 50, as shown in FIG. 4, are arranged to face each other in the area where the back cover 18 is formed. For example, the first part 56 may bend in the first and second directions D1 and D2, as shown in FIG. 5, and the second part 57 may remain stationary.

The back cover 18 is provided with a second protrusion 18a protruding upward from an outside upper surface of the back cover 18 toward an inside lower surface of the first part 56 of the sidewall where it covers the back cover 18, and the first part 56 is provided with a second coupling recess 56c positioned at an inside surface thereof facing the outside upper surface of the back cover 18 to accommodate the second protrusion 18a.

Thus, the light guide plate 30 and the light source unit 10 may be accommodated in the receiving container 50 after the first part 56 bends in the first direction D1, as shown in FIG. 5. Then, when the first part 56 bends in the second direction D2, as shown in FIG. 5, the second protrusion 18a is accommodated in the second coupling recess 56c.

The first part 56 may be prevented from being bent in the first direction D1 by coupling the second coupling recess 56c to the second protrusion 18a.

Figure 8:
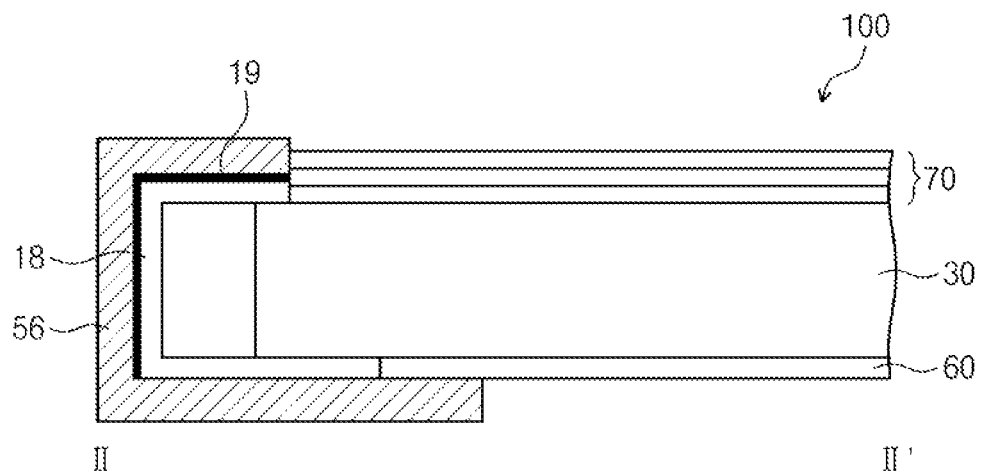
FIG. 8 is a cross-sectional view showing a backlight assembly according to another exemplary embodiment of the present disclosure.

FIG. 8 is a cross-sectional view showing a backlight assembly according to another exemplary embodiment of the present disclosure.

Referring to FIG. 8, a double-sided adhesive film 19 is disposed between the back cover 18 and the first part 56.

The light source unit 10 and the light guide plate 30 may be accommodated in the receiving container 50 after the first part 56 bends in the first direction D1, as shown in FIG. 5. When the first part 56 bends in the second direction D2, as shown in FIG. 5, the first part 56 is fixed to the back cover 18 by the double-sided adhesive film 19 attached to the back cover 18.

Thus, a double-sided adhesive film 19 may prevent the first part 56 from bending in the first direction D1.

Figure 9:
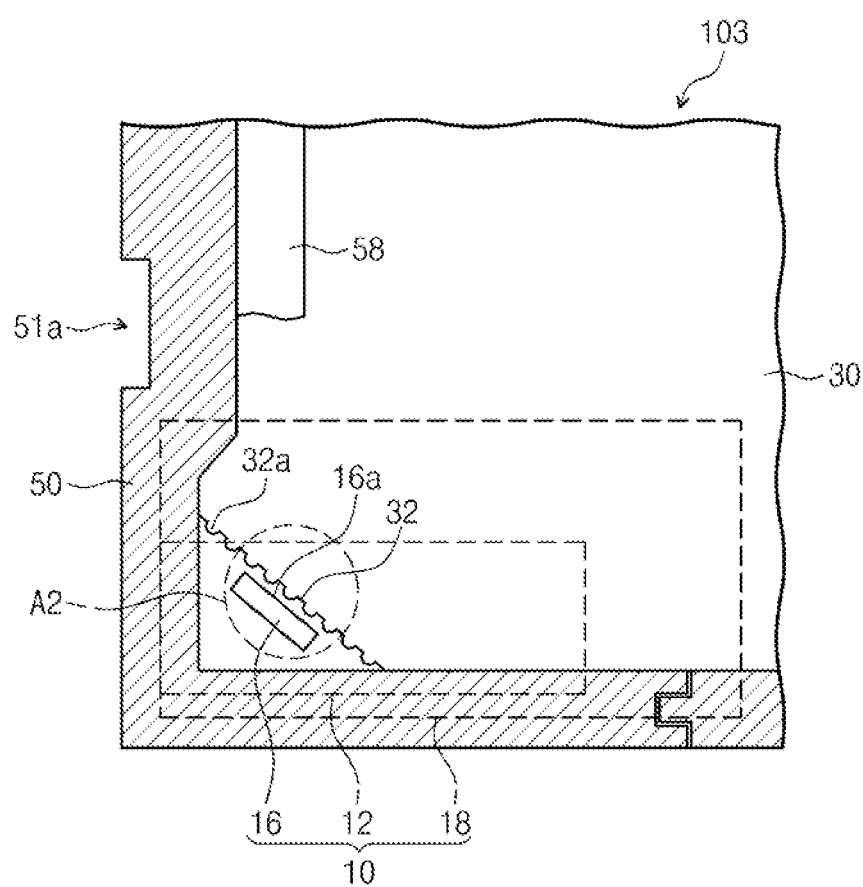
FIG. 9 is a plan view partially showing a backlight assembly according to another exemplary embodiment of the present disclosure.
Figure 10:
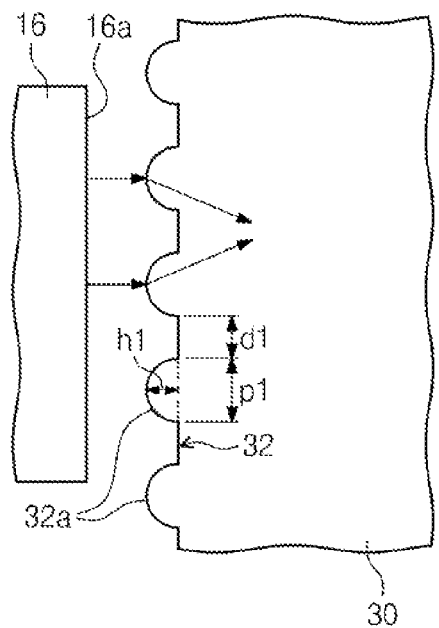
FIG. 10 is a partially enlarged view showing a portion A2 of FIG. 9.

FIG. 9 is a plan view partially showing a backlight assembly according to another exemplary embodiment of the present disclosure, and FIG. 10 is a partially enlarged view showing a portion A2 of FIG. 9. In FIG. 9, the same reference numerals denote the same elements in FIG. 3, and thus detailed descriptions of the same elements will be omitted.

Referring to FIG. 9, a backlight assembly 103 has the same structure and function as the backlight assembly 100 shown in FIG. 3 except for a light guide plate 30.

The light guide plate 30 has a plurality of convex patterns 32a protruding from a light incident surface 32 toward a light emitting surface of the light source 16 provided to the light guide plate 30. The convex patterns 32a diffuse light emitted from a light emitting surface 16a through the light incident surface 32. Therefore, the light provided to the light guide plate 30 may be more uniformly distributed over an entire surface of the light guide plate 30.

As shown in FIG. 10, a distance d1 between two adjacent convex patterns 32a may be about 160 micrometers. Also, each of the convex patterns 32a may protrud from the light incident surface 32 to a height h1 of about 100 micrometers, and have a pitch p1 of about 200 micrometers.

The pitch p1 of each of the convex patterns 32a may be adjusted within a range from about 200 micrometers to about 600 micrometers according to the size of the light incident surface 32 or the light emitting surface 18. In addition, when a size of the pitch p1 is adjusted, the distance d1 and the height h1 may also be adjusted to correspond to the pitch p1 size.

Figure 11:
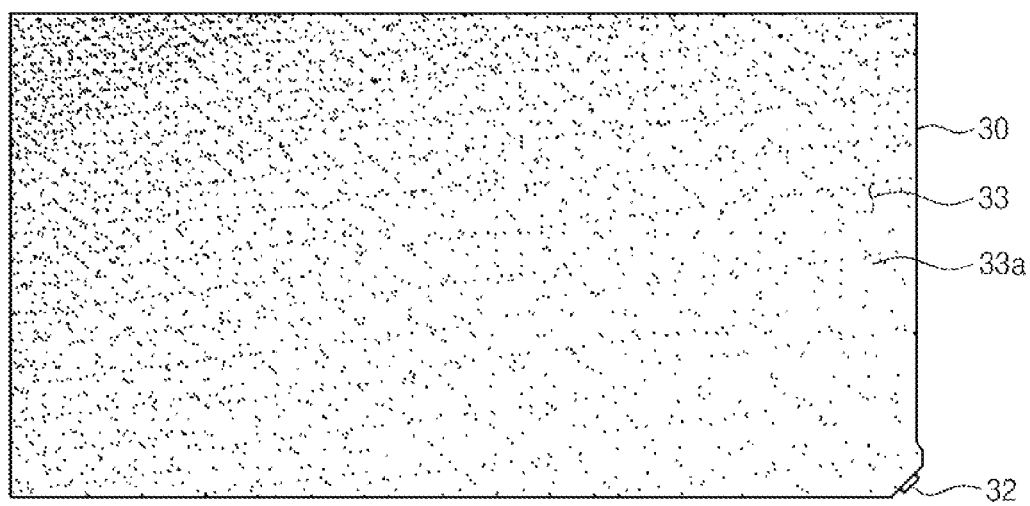
FIG. 11 is a view showing a backside of the light guide plate of FIG. 1.

FIG. 11 is a view showing a backside of the light guide plate of FIG. 1.

Referring to FIG. 11, the light guide plate 30 further includes a plurality of optical path changing patterns 33a formed at the lower surface 33 of the light guide plate 30 to change an optical path of the light received from the light source 16.

The optical path changing patterns 33a may be formed by selectively recessing the lower surface 33 to a predetermined depth. The recessed patterns 33a may be formed in the lower surface 33 using a reflow process, an etch process, a sand blast process, or a laser process. Also, the optical path changing patterns 33a may be a scattering pattern in which a scattering agent is dispersed.

As shown in FIG. 11, the optical path changing patterns 33a may have a density depending on position. In detail, the density of the optical path changing patterns 33a increases as function of a distance from the light source 16. In addition, the density of the optical path changing patterns 33a may have an angular dependence based on the azimuth of the light incident through the light incident surface 32.

As described above, varying the density of the optical path changing patterns 33a may improve the brightness uniformity of the light exiting from the upper surface 31 of the light guide plate 30.

Figure 12:
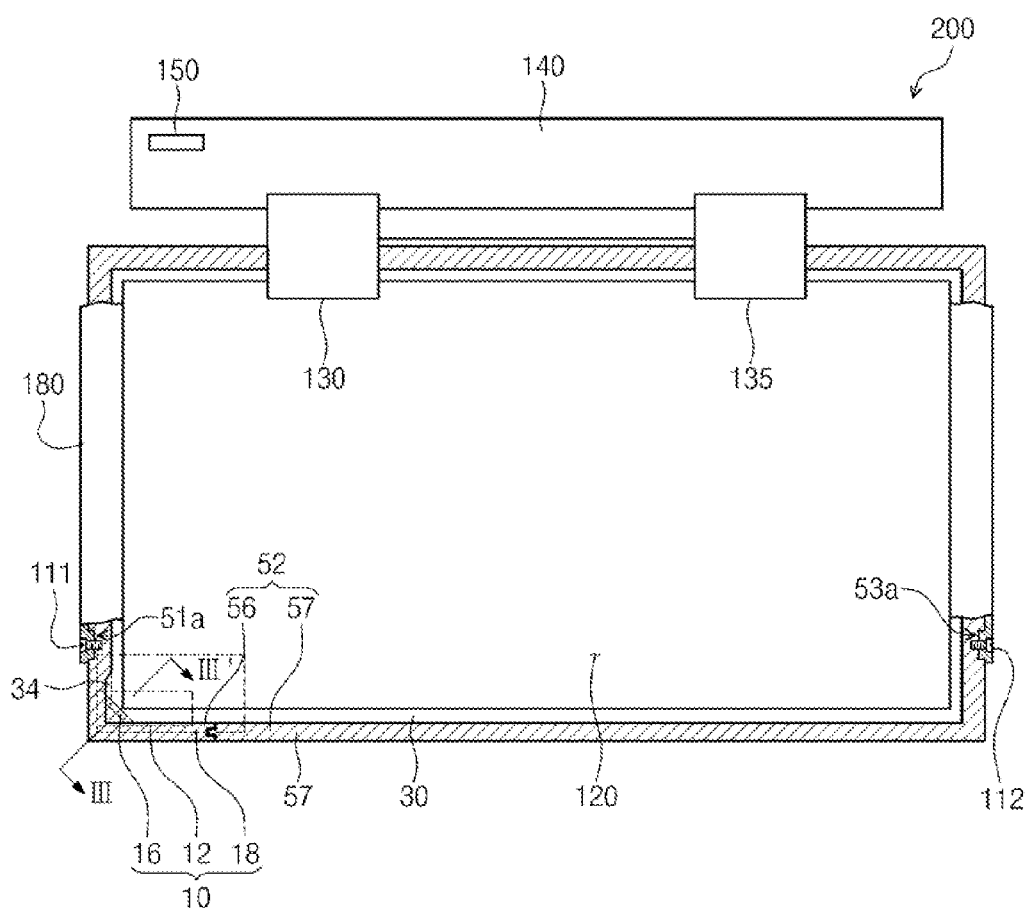
FIG. 12 is a plan view showing a display apparatus according to another exemplary embodiment of the present disclosure.
Figure 13:
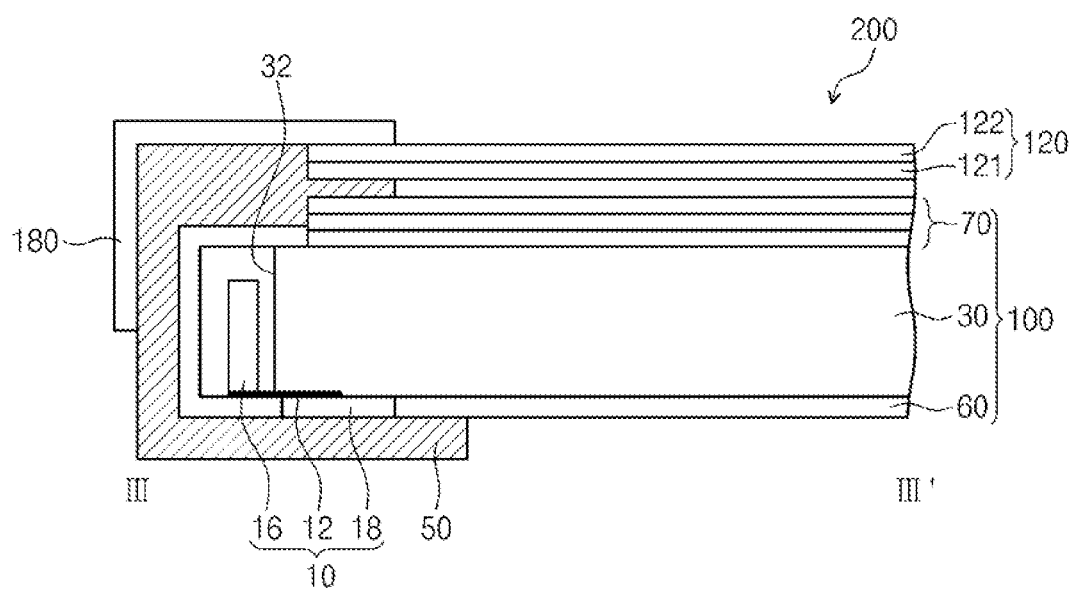
FIG. 13 is a cross-sectional view taken along a line III-III' of FIG. 12.

FIG. 12 is a plan view showing a display apparatus according to another exemplary embodiment of the present disclosure, and FIG. 13 is a cross-sectional view taken along a line III-III' of FIG. 12. The display apparatus shown in FIGS. 12 and 13 may include either the backlight assembly 100 or 103 described with reference to FIGS. 1 to 11 as its lighting element. Accordingly, detailed descriptions of the backlight assembly 100 and 103 will be omitted in FIGS. 12 and 13.

Referring to FIGS. 12 and 13, a display apparatus 200 includes a backlight assembly 100, a display panel 120, and a panel driving circuit board 140. In a present exemplary embodiment, the display apparatus 200 may be a liquid crystal display, and the display panel 120 may be a liquid crystal display panel that receives light from the backlight assembly 100 to display an image.

The display panel 120 includes a first substrate 121, a second substrate 122 facing the first substrate 121, and a liquid crystal (not shown) disposed between the first substrate 121 and the second substrate 122.

The first substrate 121 may include a plurality of pixel electrodes (not shown) and a plurality of thin film transistors electrically connected in one-to-one correspondence to the pixel electrodes. Each thin film transistor switches a driving signal provided to a corresponding pixel electrode and the pixel electrode receives a data signal provided by a data driver when the thin film transistor is turned on. The second substrate 122 may include color filter layers positioned in one-to-one correspondence with the pixel electrodes and an opposite electrode that forms an electric field with the pixel electrodes to control the arrangement of the liquid crystal.

The panel driving circuit board 140 is electrically connected to an input pad (not shown) of the display panel 120 by a first tape carrier package 130 and a second tape carrier package 135. The panel driving circuit board 140 generates a driving signal to drive the display panel 120 and provides the driving signal to the display panel 120 through the first and second tape carrier packages 130 and 135.

In addition, the panel driving circuit board 140 provides a driving power to the light source 16, shown in FIG. 1. In particular, the panel driving circuit board 140 includes a connector 150 disposed at one end portion thereof that is electrically connected to the light source unit 10, and the driving power may be provided to the light source unit 10 by coupling the connector 150 and the light source unit 10. The connection of the light source unit 10 with the connector 150 will be described in detail with reference to FIGS. 14A to 14C and 15.

The display apparatus 200 further includes a cover member 180. The cover member 180 is coupled to sidewalls of the receiving container 50 to cover an edge of the display panel 120 while exposing an area where the image is displayed. The cover member 180 may be coupled to the receiving container 50 using first and second screws 111 and 112 in one-to-one correspondence with first and second user holes 51a and 53a, shown in FIG. 1. Thus, the cover member 180 may be fixed to the receiving container 50 by the first and second screws 111 and 112.

As shown in FIG. 12, end portions of the first and second screws 111 and 112 are spaced apart from the light guide plate 30 by a predetermined distance. Accordingly, although the cover member 180 is coupled to the receiving container 50 by the first and second screws 111 and 112, the light guide plate 30 may be prevented from being damaged.

In addition, the extended portion 34 of the light incident surface 32 of the light guide plate 30, shown in FIG. 3, is arranged outside an area where the first user hole 51a is formed. As a result, although a distance between the first screw 111 and the light guide plate 30 may be reduced by the extended portion 34, the light guide plate 30 may be prevented from being damaged.

Figure 14A:
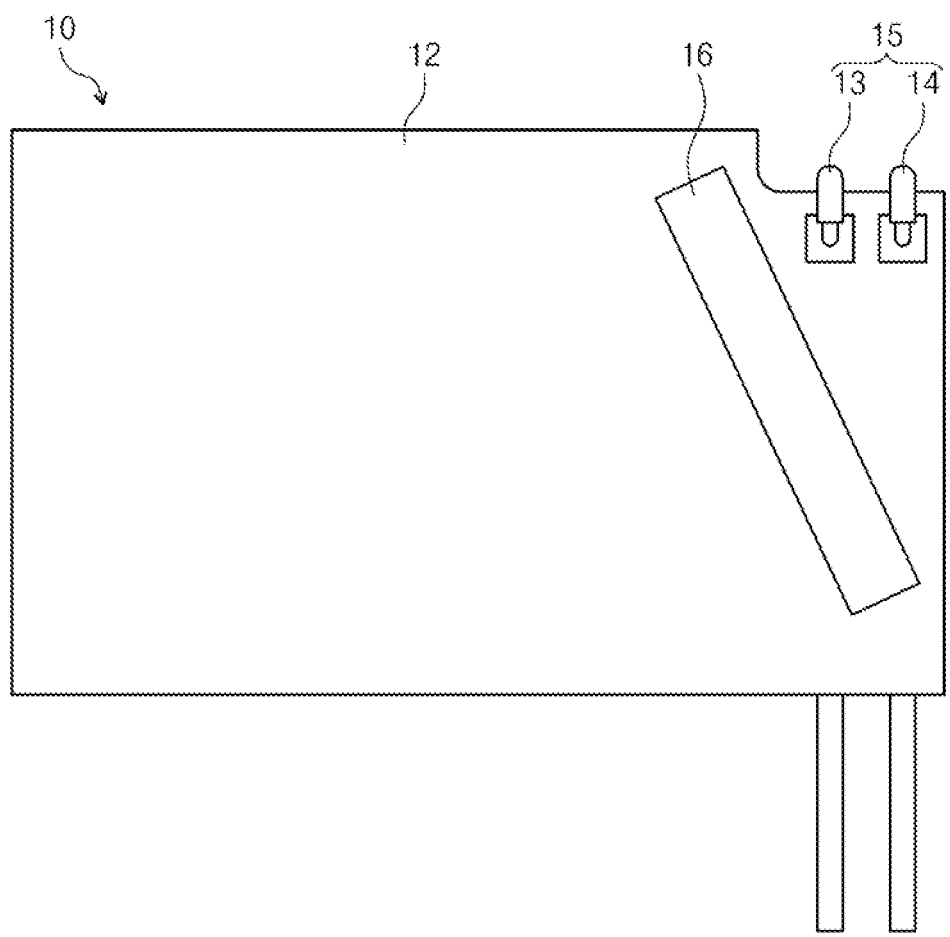
Figure 14C:
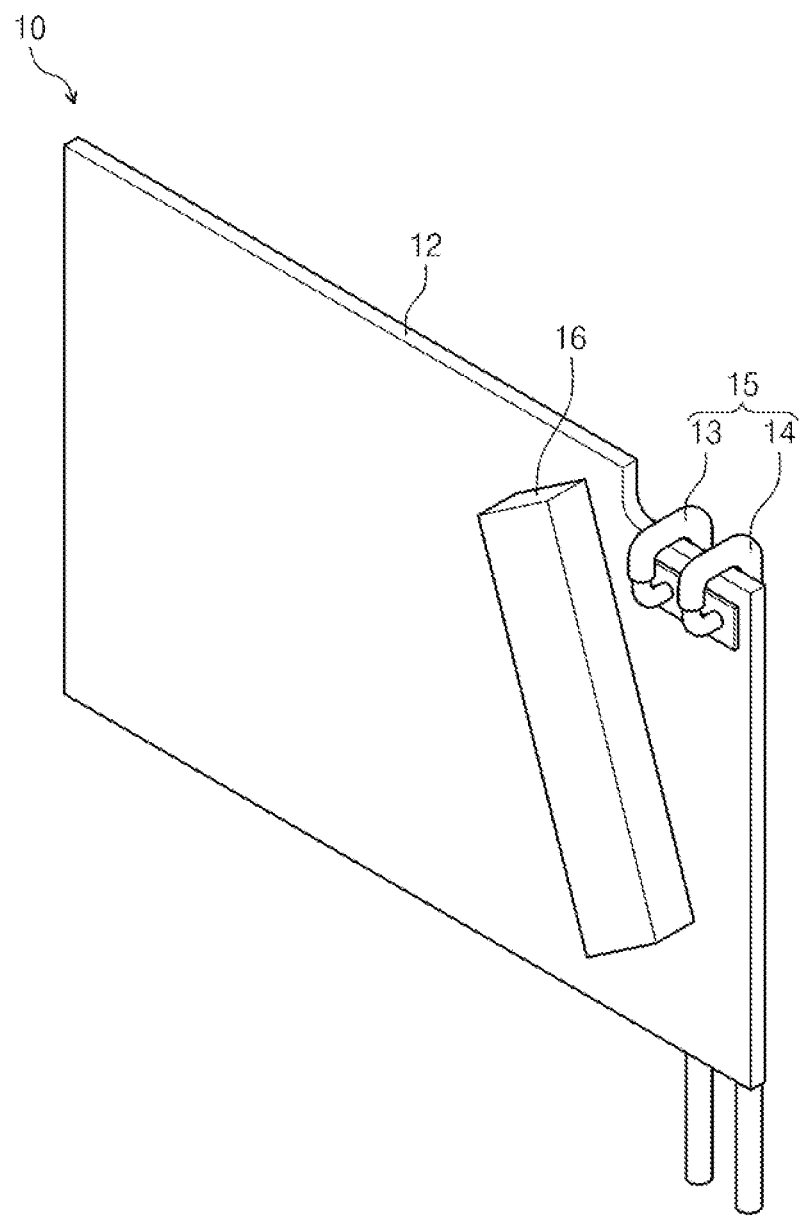

FIGS. 14A to 14C are views showing the light source unit of FIG. 12 in detail. In FIGS. 14A to 14C, detailed representations of the back cover will be omitted for the convenience of explanation.

Referring to FIGS. 14A to 14C, the light source unit 10 includes the light source 16, the circuit board 12 on which the light source 16 is mounted, and a connection part 15 electrically connecting the circuit board 12 to the panel driving circuit board 140, shown in FIG. 12.

The light source 16 is mounted on the circuit board 12 to receive the driving power from the circuit board 12. The circuit board 12 is electrically connected to the panel driving circuit board 140 through the connection part 15 to receive the driving power.

The connection part 15 may be one of a power wire, a flexible printed circuit (FPC) film, or a flexible flat cable (FFC). For example, FIGS. 14A to 14C show the connection part 15 as including a first power wire 13 and a second power wire 14.

The first and second power wires 13 and 14 may be electrically connected to the circuit board 12 by a soldering process. In a present exemplary embodiment, the first and second power wires 13 and 14 are soldered onto an upper surface of the circuit board 12 on which the light source 16 is mounted, and the first and second power wires 13 and 14 may be withdrawn to a rear surface of the circuit board 12, as shown in FIG. 14B.

Figure 15:
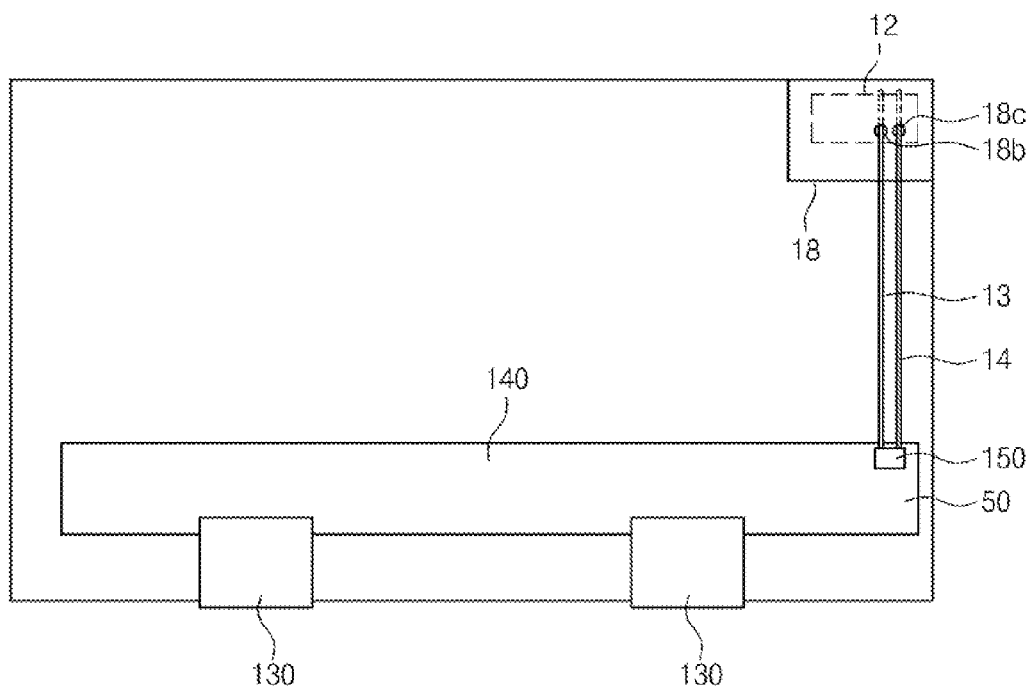
FIG. 15 is a view showing a backside of the display apparatus of FIG. 12.

FIG. 15 is a view showing a backside of the display apparatus of FIG. 12.

Referring to FIG. 15, a first withdrawal hole 18b and a second withdrawal hole 18c are formed through the circuit board 12 and the back cover 18. The first and second power wires 13 and 14 may be withdrawn to the rear surface of the back cover 18 through the first and second withdrawal holes 18b and 18c.

The withdrawn first and second power wires 13 and 14 are connected to the connector 150 in the panel driving circuit board 140.

Figure 16:
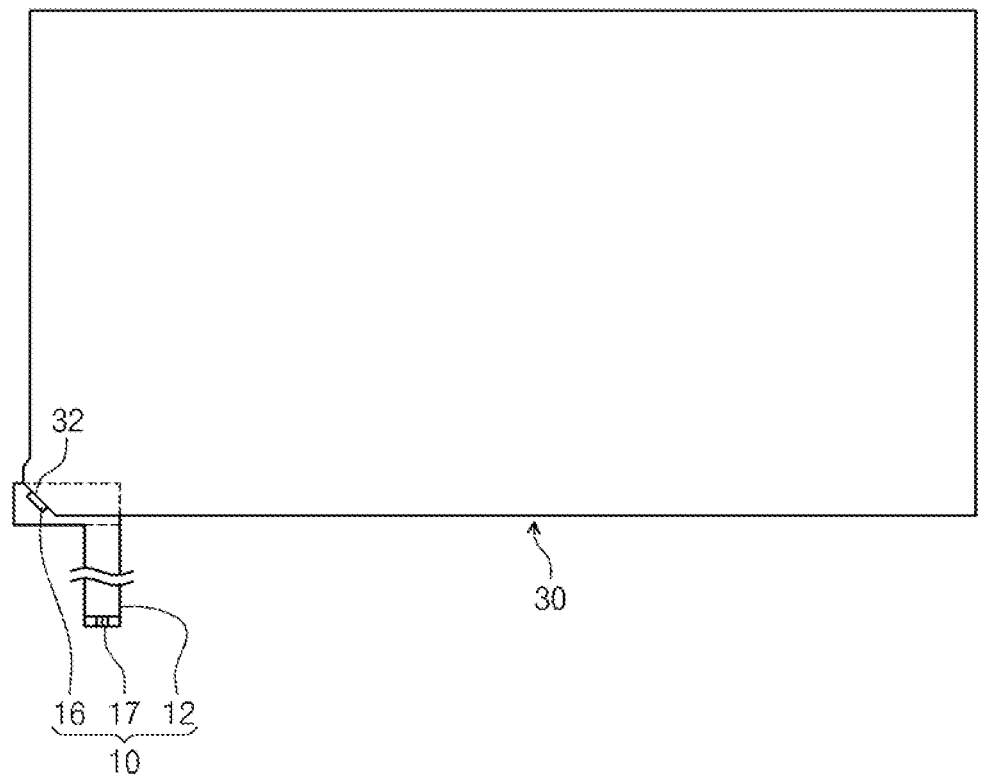
FIG. 16 is a plan view showing a connection part according to another exemplary embodiment of the present disclosure.

FIG. 16 is a plan view showing a connection part according to another exemplary embodiment of the present disclosure.

Referring to FIG. 16, a connection part may be a flexible flat cable (FFC) 17. The flexible flat cable 17 may be integrally formed with the circuit board 12 and may include terminals formed at an end portion thereof to be connected to the connector 150 of the panel driving circuit board 140.

Although exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed.

What is claimed is:

1. A backlight assembly comprising:
a light guide plate comprising a chamfered corner portion that defines a light incident surface at the corner portion;
a light source unit disposed adjacent to the light incident surface to provide light to the light guide plate through the light incident surface; and
a receiving container comprising sidewalls and a bottom portion extended from at least one of the sidewalls to accommodate the light guide plate and the light source unit,
wherein at least one of the sidewalls of the receiving container is divided into a first part and a second part at a position adjacent to the corner portion, and the first and second parts are coupled to each other while configured to be separated from each other.

2. The backlight assembly of claim 1, wherein the first and second parts comprise a first end portion and a second end portion facing the first end portion, respectively, the first part comprises a first coupling recess recessed from the first end portion, and the second part comprises a first protrusion protruding from the second end portion and accommodated in the first coupling recess.

3. The backlight assembly of claim 2, wherein the light source unit comprises:
a light source that emits light through a light emitting surface thereof facing the light incident surface; and
a back cover covering the light source and accommodated in the receiving container.

4. The backlight assembly of claim 3, wherein the first and second end portions are arranged in an area where the back cover is positioned.

5. The backlight assembly of claim 4, wherein the back cover comprises a second protrusion protruded upward from an outside surface of the back cover toward the an inside lower surface of the first part, and the first part is provided with a second coupling recess positioned at an inside surface thereof facing the outside upper surface back cover to accommodate the second protrusion.

6. The backlight assembly of claim 4, further comprising a double-sided adhesive film disposed between the back cover and the first part to fix the first part to the outside surface of the back cover.

7. The backlight assembly of claim 3, wherein the light source unit further comprises a circuit board on which the light source is mounted to provide a driving power to the light source.

8. The backlight assembly of claim 7, further comprising a panel driving circuit board electrically connected to the backlight assembly to provide a driving signal to the backlight assembly, and the light source unit further comprises a connection part that electrically connects the circuit board to the panel driving circuit board to provide the driving power to the circuit board.

9. The backlight assembly of claim 8, wherein the back cover is provided with one or more withdrawal holes through which the connection part is withdrawn, and the connection part outwardly withdrawn through the withdrawal hole is electrically connected to the panel driving circuit board.

10. The backlight assembly of claim 1, wherein the light guide plate further comprises a plurality of convex patterns protruded from the light incident surface.

11. The backlight assembly of claim 1, wherein the light guide plate further comprises a plurality of optical path changing patterns formed in a lower surface connected to and substantially perpendicular to the light incident surface, said optical path changing patterns configured to change an optical path of the light incident thereto.

12. The backlight assembly of claim 11, wherein the optical path changing patterns have a density that varies according to an azimuth of the light incident through the light incident surface.

13. The backlight assembly of claim 1, wherein the light guide plate further comprises an extended portion that extends from one side surface adjacent to the light incident surface, and lengthens the light incident surface.

14. The backlight assembly of claim 13, further comprising a cover member covering an edge portion of the backlight assembly while exposing an area where an image is displayed, wherein sidewalls of the receiving container are provided with user holes to couple the receiving container to the cover member with screw, and the extended portion is positioned outside an area where one of the user holes is formed.

15. A method of assembling a display apparatus, comprising:
preparing a light guide plate to have a chamfered corner portion to form a light incident surface at the corner portion thereof;
disposing a light source unit adjacent to the light incident surface to provide the light to the light guide plate through the light incident surface;
providing a receiving container comprising sidewalls and a bottom portion extending from at least one of the side walls, a sidewall disposed adjacent to the corner portion being divided into a first part and a second part;
separating the second part from the first part to accommodate the light guide plate and the light source in the receiving container;
coupling the first and second parts to each other after accommodating the light guide plate and the light source in the receiving container;
disposing a display panel on the receiving container, the display panel receiving light exiting from the light guide plate to display an image; and
coupling a cover member to the receiving container to cover an edge portion of the display panel while exposing an area in which the image is displayed.

16. The method of claim 15, wherein the first and second parts comprise a first end portion and a second end portion facing the first end portion, respectively, the first part comprises a first coupling recess recessed from the first end portion, the second part comprises a first protrusion protruded from the second end portion and accommodated in the first coupling recess, and the first and second parts are coupled to each other by coupling the first protrusion and the first coupling recess.

17. A backlight assembly, comprising:
a light guide plate comprising a chamfered corner portion that forms a light incident surface at the corner portion;
a light source unit disposed adjacent to the light incident surface to provide light to the light guide plate through the light incident surface; and
a receiving container configured to accommodate the light guide plate and the light source unit, wherein a sidewall of the receiving container adjacent to the corner portion is divided into a first part and a second part configured to separate from each other to receive the light guide plate and light source unit,
wherein the light guide plate further comprises an extended portion that extends from one side surface adjacent to the light incident surface, and lengthens the light incident surface.

18. The backlight assembly of claim 17, wherein the first part comprises a first end portion having a first coupling recess recessed inward, and the second part comprise a second end portion facing the first end portion and having a first protrusion protruding outward, wherein first coupling recess is configured to accommodate the first protrusion to couple the first part and the second part together.

19. The backlight assembly of claim 17, wherein the light source unit includes a back cover covering the light source unit and accommodated in the receiving container, wherein the back cover comprises a second protrusion protruding upward from an outside surface of the back cover toward the an inside lower surface of the first part, and the first part is provided with a second coupling recess positioned at an inside surface thereof facing the outside upper surface back cover to accommodate the second protrusion.

20. The backlight assembly of claim 17, wherein the light guide plate further comprises a plurality of optical path changing patterns formed in a lower surface connected with and substantially perpendicular to the light incident surface, said optical path changing patterns configured to change an optical path of light emitted from the light source unit, wherein the optical path changing patterns have a density that increases as function of a distance from the light source unit and varies according to an azimuth of the light incident through the light incident surface.

* * * * *